(12) United States Patent
Sato et al.

(10) Patent No.: US 11,959,672 B2
(45) Date of Patent: Apr. 16, 2024

(54) AIR-CONDITIONING APPARATUS

(71) Applicant: Mitsubishi Electric Corporation, Tokyo (JP)

(72) Inventors: Masakazu Sato, Tokyo (JP); Masakazu Kondo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 17/619,770

(22) PCT Filed: Sep. 20, 2019

(86) PCT No.: PCT/JP2019/037053
§ 371 (c)(1),
(2) Date: Dec. 16, 2021

(87) PCT Pub. No.: WO2021/053820
PCT Pub. Date: Mar. 25, 2021

(65) Prior Publication Data
US 2022/0357085 A1 Nov. 10, 2022

(51) Int. Cl.
*F25B 41/20* (2021.01)
*F25B 13/00* (2006.01)

(52) U.S. Cl.
CPC .............. *F25B 41/20* (2021.01); *F25B 13/00* (2013.01)

(58) Field of Classification Search
CPC .... F25B 41/20; F25B 13/00; F25B 2600/111; F25B 2600/112
See application file for complete search history.

(56) References Cited

U.S. PATENT DOCUMENTS 6,220,043 B1 * 4/2001 Chaney, Jr. .............. F24F 11/83
62/158
2015/0292789 A1 10/2015 Takenaka et al.
(Continued)

FOREIGN PATENT DOCUMENTS

JP 01111150 A * 4/1989
JP H04-3843 A 1/1992
(Continued)

OTHER PUBLICATIONS

JP-01111150-A translation (Year: 1989).*
(Continued)

*Primary Examiner* — David J Teitelbaum
(74) *Attorney, Agent, or Firm* — POSZ LAW GROUP, PLC

(57) ABSTRACT

An air-conditioning apparatus includes an outdoor heat exchanger. The outdoor heat exchanger includes a first heat exchanger and a second heat exchanger. A controller performs a heating operation and a heating-defrosting operation, in which one of the first heat exchanger and the second heat exchanger functions as an evaporator, an other one the first heat exchanger and the second heat exchanger functions as a condenser. When a temperature of the indoor heat exchanger by a temperature detection unit is treated as a first temperature, and a temperature of the indoor heat exchanger by the temperature detection unit is treated as a second temperature, the controller reduces a rotation speed of an indoor fan in a case where the second temperature is lower than the first temperature and where a difference between the first temperature and the second temperature is greater than or equal to a first setting value.

7 Claims, 7 Drawing Sheets

(56) References Cited

U.S. PATENT DOCUMENTS

2016/0238297 A1* 8/2016 Nuno .................. F25B 41/20
2018/0328635 A1 11/2018 Tashiro et al.

FOREIGN PATENT DOCUMENTS

| | | |
|---|---|---|
| JP | H05-087391 A | 4/1993 |
| JP | H05-141755 A | 6/1993 |
| JP | H05-322333 A | 12/1993 |
| JP | H10-26386 A | 1/1998 |
| JP | H10-122626 A | 5/1998 |
| JP | 2014-020568 A | 2/2014 |
| WO | 2014/083867 A1 | 6/2014 |
| WO | 2017/094148 A1 | 6/2017 |
| WO | WO-2017094148 A1 * | 6/2017 .............. F25B 13/00 |

OTHER PUBLICATIONS

WO-2017094148-A1 translation (Year: 2017).*
International Search Report dated Nov. 12, 2019, issued in corresponding International Patent Application No. PCT/JP2019/037053 (and English Machine Translation).
Office Action dated Jun. 16, 2022 issued in corresponding JP Patent Application No. 2021-546160 (and Machine Translation).
Office Action dated Dec. 6, 2022 issued in corresponding JP Patent Application No. 2021-546160 (and English machine translation).
Office Action dated Dec. 13, 2022 issued in corresponding SE Patent Application No. 2250147-2.
Office Action dated Feb. 14, 2023 issued in corresponding CN Patent Application No. 201980099827.3 (and English machine translation).

* cited by examiner

FIG. 7

| OPERATION MODE | | FIRST FLOW SWITCH DEVICE | SECOND FLOW SWITCH DEVICE |
|---|---|---|---|
| COOLING, DEFROSTING | | SECOND STATE | STATE I |
| HEATING | | FIRST STATE | STATE I |
| HEATING-DEFROSTING | DEFROSTING OF SECOND HEAT EXCHANGER | FIRST STATE | STATE II |
| | DEFROSTING OF FIRST HEAT EXCHANGER | FIRST STATE | STATE III | ions by switching a flow switching valve. Consequently, a portion of high-temperature and high-pressure refrigerant discharged from the compressor flows into the first heat exchanger through the bypass. As a result, frost formed on the first heat exchanger melts. In the meantime, the second heat exchanger continues to function as an evaporator, and thus a heating operation in the indoor heat exchanger can be maintained.

AIR-CONDITIONING APPARATUS

CROSS REFERENCE TO RELATED APPLICATION

This application is a U.S. National Stage Application of International Patent Application No. PCT/JP2019/037053 filed on Sep. 20, 2019, the disclosure of which is incorporated herein by reference.

TECHNICAL FIELD

The present disclosure relates to an air-conditioning apparatus, and particularly to an air-conditioning apparatus that can simultaneously perform a heating-defrosting operation, in which defrosting of an outdoor heat exchanger and heating of an indoor space are simultaneously performed.

BACKGROUND

When an air-conditioning apparatus performs a heating operation, frost may form on an outdoor heat exchanger. The outdoor heat exchanger causes heat exchange to be performed between refrigerant flowing therein and outdoor air. However, when frost forms on the outdoor heat exchanger, the heat exchange efficiency of the outdoor heat exchanger decreases, and the heating efficiency of the air-conditioning apparatus decreases.

Thus, there may be a case where the air-conditioning apparatus performs a defrosting operation to melt frost formed on the outdoor heat exchanger. In the defrosting operation, the heating operation is stopped, and a four-way valve is switched to be in the same state as that for the time of a cooling operation. Similarly to as at the time of the cooling operation, the outdoor heat exchanger is caused to function as a condenser to melt frost formed on the outdoor heat exchanger.

During the defrosting operation, the temperature of an indoor heat exchanger functioning as an evaporator becomes low. Thus, cold air is supplied from an indoor unit when an indoor fan is left rotating. In that case, the degree of comfort in the indoor space significantly decreases. The indoor fan is thus stopped during the defrosting operation. In a case where the heating operation is restarted after performing the defrosting operation, the indoor fan starts rotating after the indoor heat exchanger becomes warm.

In an air-conditioning apparatus described in Patent Literature 1, an outdoor heat exchanger is divided into two portions, which are an upper portion and a lower portion. One of the two portions is treated as a first heat exchanger, and the other is treated as a second heat exchanger. The air-conditioning apparatus is provided with a bypass that causes a portion of high-temperature and high-pressure refrigerant discharged from a compressor to flow into the first heat exchanger and the second heat exchanger.

In the air-conditioning apparatus described in Patent Literature 1, when the first heat exchanger is defrosted, a controller causes the bypass and the first heat exchanger to communicate with each other by switching a flow switching valve. Consequently, a portion of high-temperature and high-pressure refrigerant discharged from the compressor flows into the first heat exchanger through the bypass. As a result, frost formed on the first heat exchanger melts. In the meantime, the second heat exchanger continues to function as an evaporator, and thus a heating operation in the indoor heat exchanger can be maintained.

Similarly, in the air-conditioning apparatus described in Patent Literature 1, when the second heat exchanger is defrosted, the controller causes the bypass and the second heat exchanger to communicate with each other by switching the flow switching valve. Consequently, while defrosting the second heat exchanger, the first heat exchanger can be caused to function as an evaporator.

In this manner, in the air-conditioning apparatus described Patent Literature 1, a heating-defrosting operation can be performed in which the heating operation in the indoor heat exchanger is continued while defrosting two heat exchangers installed outdoors in an alternating manner. Thus, the degree of comfort in the indoor space can be prevented from being lost even during defrosting.

PATENT LITERATURE

Patent Literature 1: International Publication No. WO2017/094148

As described above, generally, since the heating operation is stopped during the defrosting operation, the temperature of the indoor space decreases, and the degree of comfort decreases.

In contrast, during the heating-defrosting operation of Patent Literature 1, the heating operation is continued, and warm air can be supplied. However, there may be a case where the heating capacity becomes lower than that for a normal heating operation. In that case, the temperature of air supplied from the indoor unit decreases. In this case, the temperature of the room decreases, and the degree of comfort in the indoor space decreases although not to the same extent as in the defrosting operation.

SUMMARY

The present disclosure has been made to solve problems as described above, and an object of the present disclosure is to provide an air-conditioning apparatus that prevents the temperature of a room from decreasing and maintains the degree of comfort in the indoor space during a heating-defrosting operation.

An air-conditioning apparatus according to an embodiment the present disclosure includes a compressor having a suction port for sucking refrigerant and a discharge port for discharging the refrigerant, an indoor heat exchanger that is connected to the discharge port of the compressor and functions as a condenser at a time of a heating operation, an outdoor heat exchanger that is connected to the suction port of the compressor and functions as an evaporator at the time of the heating operation, a bypass pipe connected to the discharge port of the compressor, a flow switch device provided between the bypass pipe and the outdoor heat exchanger, an indoor fan that sends air to the indoor heat exchanger, a temperature detection unit configured to detect a temperature of the indoor heat exchanger, and a controller. The outdoor heat exchanger includes a first heat exchanger and a second heat exchanger, in which refrigerant flow paths are independent of each other. The flow switch device switches between connection and disconnection between the first heat exchanger and the bypass pipe and switches between connection and disconnection between the second heat exchanger and the bypass pipe in accordance with a control signal from the controller. The controller performs the heating operation, in which the first heat exchanger and the second heat exchanger are caused to function as an evaporator, and the indoor heat exchanger is caused to function as a condenser, and a heating-defrosting operation, in which one out of the first heat exchanger and the second heat exchanger is caused to function as an evaporator, an other one out of the first heat exchanger and the second heat exchanger is caused to function as a condenser, and the indoor heat exchanger is caused to function as a condenser. When a temperature of the indoor heat exchanger detected at a time of a start of the heating-defrosting operation by the temperature detection unit is treated as a first temperature, and a temperature of the indoor heat exchanger detected during the heating-defrosting operation by the temperature detection unit is treated as a second temperature, the controller reduces a rotation speed of the indoor fan in a case where the second temperature is lower than the first temperature and where a difference between the first temperature and the second temperature is greater than or equal to a first setting value during the heating-defrosting operation.

With an air-conditioning apparatus according to an embodiment of the present disclosure, the temperature of a room can be prevented from decreasing, and the degree of comfort in the indoor space can be maintained during a heating-defrosting operation.

BRIEF DESCRIPTION OF DRAWINGS

FIG. 7 is a diagram illustrating the states of a first flow switch device and a second flow switch device in respective operation modes of the air-conditioning apparatuses according to Embodiments 1 to 4.

DETAILED DESCRIPTION

Figure 1:
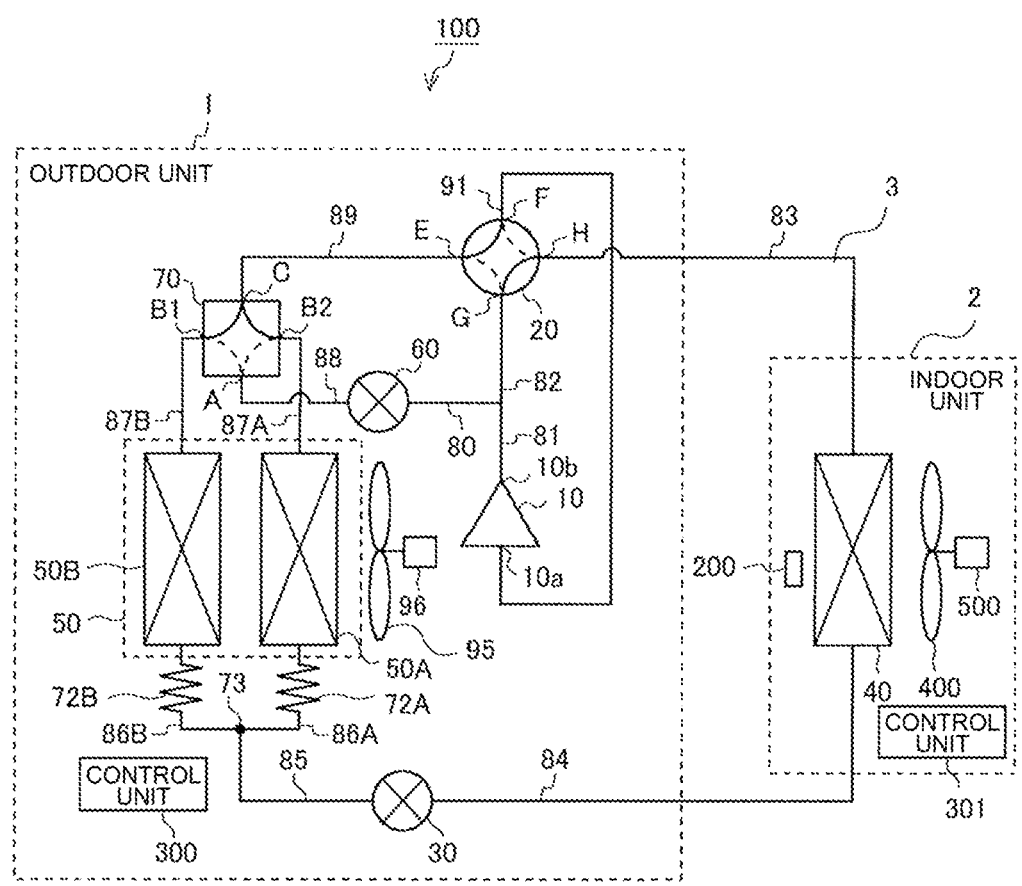
FIG. 1 is a configuration diagram illustrating the configuration of an air-conditioning apparatus according to Embodiment 1.

In the following, embodiments of an air-conditioning apparatus 100 according to the present disclosure will be described with reference to the drawings. The present disclosure is not limited to Embodiments 1 to 4 below, and various changes can be made without departing from the gist of the present disclosure. Moreover, the present disclosure includes all combinations that can be made from configurations illustrated in Embodiments 1 to 4 below. In the individual drawings, items denoted by the same reference numerals are identical or substantially identical, and this applies to the entire description of the present specification. Note that, in each drawing, there may be a case where the relationship between the relative sizes of or the shapes of individual components may be different from the actual relationship or shapes.

Embodiment 1

FIG. 1 is a configuration diagram illustrating the configuration of an air-conditioning apparatus 100 according to Embodiment 1. As illustrated in FIG. 1, the air-conditioning apparatus 100 is a separate-type air-conditioning apparatus in which an outdoor unit 1 and an indoor unit 2 are connected to each other by, for example, refrigerant pipes and electrical wiring lines. The air-conditioning apparatus 100 includes a refrigeration cycle, an air-sending apparatus, and a control system.

A refrigeration cycle 3 includes a compressor 10, a four-way valve 20, a flow switching valve 70, an outdoor heat exchanger 50, an expansion valve 30, an indoor heat exchanger 40, a bypass valve 60, a bypass pipe 80, and refrigerant pipes 81, 82, 83, 84, 85, 86A, 86B, 87A, 87B, 88, 89, and 91. In the refrigeration cycle 3, at the time of a heating operation, refrigerant circulates through a refrigerant flow path in the order of the compressor 10, the indoor heat exchanger 40, the expansion valve 30, and the outdoor heat exchanger 50.

As refrigerant flowing in the refrigeration cycle 3, various types of refrigerant can be used. For example, R32, R410A, or the like can be used.

The refrigeration cycle 3 is configured to be able to perform a heating operation, a defrosting operation, a heating-defrosting operation, and a cooling operation.

The air-sending apparatus includes an indoor fan 400, an indoor fan motor 500, an outdoor fan 95, and an outdoor fan motor 96, which will be described below.

The control system includes a controller 300, a controller 301, and various types of sensor such as a temperature detection unit 200, which will be described below.

As illustrated in FIG. 1, the indoor heat exchanger 40, the temperature detection unit 200, the indoor fan 400, the indoor fan motor 500, and the controller 301 are housed in the casing of the indoor unit 2.

The indoor heat exchanger 40 is connected between the refrigerant pipe 84 and the refrigerant pipe 83. The indoor heat exchanger 40 has a heat transfer pipe and a heat exchanger fin. The indoor heat exchanger 40 causes heat exchange to be performed between indoor space air and refrigerant flowing in the heat transfer pipe. The indoor heat exchanger 40 functions as a condenser at the time of the heating operation and at the time of the heating-defrosting operation and functions as an evaporator at the time of the defrosting operation and at the time of the cooling operation.

The temperature detection unit 200 is provided for the indoor heat exchanger 40. The temperature detection unit 200 is configured to detect the temperature of the indoor heat exchanger 40 at predetermined intervals. Data on the temperature of the indoor heat exchanger 40 detected by the temperature detection unit 200 is stored in a memory to be described later and provided in the controller 300. Temperature data stored in the memory may only be the latest temperature data or may be historical data corresponding to a predetermined period. The temperature detection unit 200 measures the temperature of the indoor heat exchanger 40 at the time of the cooling operation, at the time of the heating operation, and at the time of the heating-defrosting operation. Note that the temperature detection unit 200 may detect the temperature of refrigerant flowing inside the indoor heat exchanger 40 as the temperature of the indoor heat exchanger 40. In that case, the temperature detection unit 200 may detect the surface temperature of the heat transfer pipe of the indoor heat exchanger 40 and outputs the temperature as the temperature of refrigerant. Alternatively, the temperature detection unit 200 may detect the temperature of the heat exchanger fin of the indoor heat exchanger 40 as the temperature of the indoor heat exchanger 40. As the temperature detection unit 200, various types of sensor such as a temperature sensor or an infrared sensor can be used.

The indoor fan 400 is arranged to send indoor space air to the indoor heat exchanger 40. For example, in a case where the indoor fan 400 is a cross flow fan, the indoor heat exchanger 40 is arranged upstream of the indoor fan 400.

The indoor fan motor 500 drives the indoor fan 400. The controller 301 controls the rotation speed of the indoor fan 400 by outputting a control signal to the indoor fan motor 500. The amount of heat exchange between refrigerant and indoor space air in the indoor heat exchanger 40 can be adjusted by changing the rotation speed of the indoor fan 400. Data on the rotation speed of the indoor fan 400 is stored in a memory of the controller 301 at predetermined intervals. Rotation speed data stored in the memory may only be the latest rotation speed data or may be historical data corresponding to a predetermined period.

The controller 301 has a microcomputer including a processor, a read-only memory (ROM), a random access memory (RAM), and an input-output (I/O) port. The ROM and the RAM are memories of the controller 301. The controller 301 receives a detection signal from the temperature detection unit 200 and an operation signal from an operation unit that accepts an operation performed by the user. On the basis of these received signals, the controller 301 controls an operation of the entirety of the indoor unit 2 including the indoor heat exchanger 40, the indoor fan motor 500, and the indoor fan 400. The controller 301 of the indoor unit 2 and the controller 300 of the outdoor unit 1 communicate necessary information to and from each other. For example, information regarding the start and the end of the heating-defrosting operation is transmitted from the controller 300 of the outdoor unit 1 to the controller 301 of the indoor unit 2.

The compressor 10, the four-way valve 20, the expansion valve 30, the outdoor heat exchanger 50, the bypass valve 60, the flow switching valve 70, the controller 300, the outdoor fan 95, and the outdoor fan motor 96 are housed in the casing of the outdoor unit 1.

The compressor 10 has a suction port 10a through which refrigerant is sucked and a discharge port 10b from which refrigerant is discharged. The suction port 10a of the compressor 10 is connected to the refrigerant pipe 91, and the discharge port 10b of the compressor 10 is connected to the refrigerant pipe 81. The compressor 10 compresses low-pressure refrigerant sucked through the refrigerant pipe 91 and discharges high-pressure refrigerant into the refrigerant pipe 81. Thus, the refrigerant pipe 91 is a suction pipe of the compressor 10, and the refrigerant pipe 81 is a discharge pipe of the compressor 10. As the compressor 10, an inverter-driven compressor is used that can adjust operation frequency. An operation frequency range is preset for the compressor 10. The compressor 10 operates at a variable operation frequency included in the operation frequency range in accordance with a control signal from the controller 300. The output of the compressor 10 can be adjusted by changing the operation frequency of the compressor 10. Various types of compressor can be used as the compressor 10. For example, a rotary compressor, a reciprocating compressor, a scroll compressor, a screw compressor, or the like may be used.

The four-way valve 20 is a first flow switch device that changes the direction of flow of refrigerant in the refrigeration cycle 3. The four-way valve 20 has four ports E, F, G, and H. The refrigerant pipe 89 is connected to the port E, the refrigerant pipe 91 is connected to the port F, the refrigerant pipe 82 is connected to the port G, and the refrigerant pipe 83 is connected to the port H. The refrigerant pipe 82 is connected to the refrigerant pipe 81, which is the discharge pipe of the compressor 10.

The four-way valve 20 may have a first state and a second state. In the first state, as indicated by a solid line in FIG. 1, the port E communicates with the port F, and the port G communicates with the port H. In the second state, as indicated by a broken line in FIG. 1, the port F communicates with the port H, and the port E communicates with the port G. As illustrated in FIG. 7, in accordance with a control signal from the controller 300, the four-way valve 20 is set to be in the first state at the time of the heating operation and at the time of the heating-defrosting operation and the second state at the time of the defrosting operation and at the time of the cooling operation. Note that FIG. 7 is a diagram illustrating the states of a first flow switch device and a second flow switch device in respective operation modes of air-conditioning apparatuses according to Embodiments 1 to 4.

Here, a case is stated where the four-way valve 20 is used as the first flow switch device; however, the first flow switch device does not have to be a four-way valve. As the first flow switch device, a combination of a plurality of two-way or three-way valves can be used.

In this manner, in the first state, as indicated by the solid line in FIG. 1, the port E and the port F of the four-way valve 20 communicate with each other, and the port G and the port H of the four-way valve 20 communicate with each other. As a result, the refrigerant pipe 82 and the refrigerant pipe 83 are connected to each other, and the refrigerant pipe 89 and the refrigerant pipe 91 are connected to each other.

In the second state, as indicated by the broken line in FIG. 1, the port G and the port E of the four-way valve 20 communicate with each other, and the port H and the port F of the four-way valve 20 communicate with each other. As a result, the refrigerant pipe 82 and the refrigerant pipe 89 are connected to each other, and the refrigerant pipe 83 and the refrigerant pipe 91 are connected to each other.

The outdoor heat exchanger 50 is a fin tube heat exchanger including a plurality of heat transfer pipes and a plurality of heat exchanger fins. The outdoor heat exchanger 50 includes two heat exchangers 50A and 50B, in which refrigerant flow paths are independent of each other. That is, a first heat exchanger 50A and a second heat exchanger 50B are connected in parallel with each other in the refrigeration cycle 3. The heat exchanger 50A is arranged above the heat exchanger 50B in a vertical direction. In the following, the heat exchanger 50A, which is the upper heat exchanger, is called the first heat exchanger 50A, and the heat exchanger 50B, which is the lower heat exchanger, is called the second heat exchanger 50B. In this manner, the first heat exchanger 50A is arranged above the second heat exchanger 50B. The heat exchanger fins of the first heat exchanger 50A may be or do not have to be separated from those of the second heat exchanger 50B.

Each of the first heat exchanger 50A and the second heat exchanger 50B includes a plurality of heat transfer pipes and a plurality of heat exchanger fins. Each of the first heat exchanger 50A and the second heat exchanger 50B causes heat exchange to be performed between refrigerant flowing through the heat transfer pipes and outdoor air sent by the outdoor fan 95. The first heat exchanger 50A and the second heat exchanger 50B function as an evaporator at the time of the heating operation and function as a condenser at the time of the cooling operation and at the time of the defrosting operation. Note that, at the time of the heating-defrosting operation, one out of the first heat exchanger 50A and the second heat exchanger 50B functions as an evaporator, and the other one functions as a condenser. When functioning as a condenser, the first heat exchanger 50A and the second heat exchanger 50B can perform defrosting. During the heating-defrosting operation, the first heat exchanger 50A and the second heat exchanger 50B alternately function as a condenser.

The outdoor fan 95 is arranged to send outdoor air to the outdoor heat exchanger 50. For example, in a case where the outdoor fan 95 is a propeller fan, the outdoor heat exchanger 50 is arranged upstream of the outdoor fan 95.

The outdoor fan motor 96 drives the outdoor fan 95. The controller 300 controls, by outputting a control signal, the outdoor fan motor 96 to change the rotation speed of the outdoor fan 95. The amount of heat exchange between refrigerant and outdoor air in the outdoor heat exchanger 50 can be adjusted by changing the rotation speed of the outdoor fan 95.

Note that the outdoor fan 95 may be formed of one fan or two fans. In a case where the outdoor fan 95 is formed of one fan, the fan sends air to both of the first heat exchanger 50A and the second heat exchanger 50B. In contrast, in a case where the outdoor fan 95 is formed of two fans, these two fans are arranged such that one of the two fans is arranged above the other one.

One end of the refrigerant pipe 81 is connected to the discharge port 10b of the compressor 10. The other end of the refrigerant pipe 81, one end of the bypass pipe 80, and one end of the refrigerant pipe 82 are connected to each other such that the other end of the refrigerant pipe 81 branches into the bypass pipe 80 and the refrigerant pipe 82. The other end of the refrigerant pipe 82 is connected to the port G of the four-way valve 20. The other end of the bypass pipe 80 is connected to the bypass valve 60.

The refrigerant pipe 83 connects the port H of the four-way valve 20 to the indoor heat exchanger 40. The refrigerant pipe 84 connects the indoor heat exchanger 40 to the expansion valve 30. One end of the refrigerant pipe 85 is connected to the expansion valve 30. The other end of the refrigerant pipe 85, one end of the refrigerant pipe 86A, and one end of the refrigerant pipe 86B are connected to each other at a connection point 73 such that the other end of the refrigerant pipe 85 branches into the refrigerant pipe 86A and the refrigerant pipe 86B.

The other end of the refrigerant pipe 86A is connected to the first heat exchanger 50A, and the other end of the refrigerant pipe 86B is connected to the second heat exchanger 50B. The refrigerant pipe 86A has a capillary tube 72A, and the refrigerant pipe 86B has a capillary tube 72B.

The refrigerant pipe 87A connects the first heat exchanger 50A to a port B2 of the flow switching valve 70, and the refrigerant pipe 87B connects the second heat exchanger 50B to a port B1 of the flow switching valve 70.

The refrigerant pipe 88 connects the bypass valve 60 to a port A of the flow switching valve 70. The refrigerant pipe 89 connects a port C of the flow switching valve 70 to the port E of the four-way valve 20.

The refrigerant pipe 91 connects the port F of the four-way valve 20 to the suction port 10a of the compressor 10.

The expansion valve 30 is an example of a pressure reducing device that reduces the pressure of high-pressure refrigerant flowing thereinto and discharges low-pressure refrigerant. As the expansion valve 30, an electronic expansion valve is used whose opening degree is adjustable in accordance with a control signal from the controller 300.

The bypass pipe 80 is a hot gas bypass flow path along which a portion of refrigerant discharged from the discharge port 10b of the compressor 10 is supplied to the first heat exchanger 50A and the second heat exchanger 50B. Refrigerant supplied from the bypass pipe 80 is used to defrost the first heat exchanger 50A and the second heat exchanger 50B. To the bypass pipe 80, the bypass valve 60 is connected as an expansion device. The bypass valve 60 reduces the pressure of high-pressure refrigerant discharged from the discharge port 10b of the compressor 10 to intermediate pressure. In a case where the first heat exchanger 50A is to be defrosted, refrigerant whose pressure is reduced to intermediate pressure by the bypass valve 60 is guided to the first heat exchanger 50A through the flow switching valve 70. In a case where the second heat exchanger 50B is to be defrosted, refrigerant whose pressure is reduced to intermediate pressure by the bypass valve 60 is guided to the second heat exchanger 50B through the flow switching valve 70. Note that, as the bypass valve 60, an electronic expansion valve is used whose opening degree is adjustable in accordance with a control signal from the controller 300; however, the bypass valve 60 is not limited to that case, and a capillary tube may be used.

The flow switching valve 70 is an example of the second flow switch device, which switches the flow of refrigerant between at the time of the heating operation, at the time of the defrosting operation, at the time of the cooling operation, and at the time of the heating-defrosting operation. In accordance with a control signal from the controller 300, the second flow switch device switches between connection and disconnection between the first heat exchanger 50A and the bypass pipe 80 and switches between connection and disconnection between the second heat exchanger 50B and the bypass pipe 80. In FIG. 1, as the flow switching valve 70, a four-way valve having the four ports A, B1, B2, and C is used. The flow switching valve 70 may have a state I, a state II, and a state III in accordance with a control signal from the controller 300. In the state I, as indicated by the solid line in FIG. 1, the port C communicates with the port B1, and the port C communicates with the port B2; however, the port A communicates with neither the port B1 nor the port B2. In the state II, the port A communicates with the port B1, and the port C communicates with the port B2. In the state III, the port A communicates with the port B2, and the port C communicates with the port B1. Under control performed by the controller 300, the flow switching valve 70 is set to be in the state I at the time of the heating operation, at the time of the defrosting operation, and at the time of the cooling operation and in the state II or the state III at the time of the heating-defrosting operation.

The controller 300 has a microcomputer including a processor, a read-only memory (ROM), a random access memory (RAM), and an input-output (I/O) port. The ROM and the RAM are memories of the controller 300. The controller 300 receives detection signals from various types of sensors provided for the outdoor unit 1 and information transmitted from the indoor unit 2. On the basis of these received signals and information, the controller 300 changes the frequency of the compressor 10 and the rotation speed of the outdoor fan 95 and adjusts the opening degree of the four-way valve 20, that of the expansion valve 30, that of the flow switching valve 70, and that of the bypass valve 60.

Next, the operation of the air-conditioning apparatus 100 will be described. The air-conditioning apparatus 100 has four operation modes, which are the cooling operation, the heating operation, the defrosting operation, and the heating-defrosting operation. A difference between the defrosting operation and the heating-defrosting operation will be described. The defrosting operation is an operation in which heating is temporarily stopped to defrost the outdoor heat exchanger 50. In contrast, the heating-defrosting operation is an operation in which the outdoor heat exchanger 50 is defrosted while performing heating. In the following, the operation of the air-conditioning apparatus 100 in the four operation modes will be described.

First, the operation of the air-conditioning apparatus 100 at the time of the cooling operation and at the time of the defrosting operation will be described. At the time of the cooling operation and at the time of the defrosting operation, the four-way valve 20 is set to be in the second state. In the second state, the port F communicates with the port H, and the port E communicates with the port G. The flow switching valve 70 is set to be in the state I. In the state I, the port C communicates with the port B1, and the port C communicates with the port B2. Note that the bypass valve 60 may be open or closed. In the flow switching valve 70, the port B1 communicates with the port C, and the port B2 communicates with the port C. Thus, even when refrigerant is present in the refrigerant pipe 88, refrigerant does not flow out from the port A to another port. For the four-way valve 20, the flow switching valve 70, and the bypass valve 60, settings at the time of the cooling operation are the same as settings at the time of the defrosting operation.

High-temperature and high-pressure gas refrigerant discharged from the discharge port 10b of the compressor 10 flows through the four-way valve 20, splits at the flow switching valve 70, and flows into the first heat exchanger 50A and the second heat exchanger 50B. At the time of the cooling operation and at the time of the defrosting operation, both of the first heat exchanger 50A and the second heat exchanger 50B function as a condenser. That is, gas refrigerant that has flowed into the first heat exchanger 50A and gas refrigerant that has flowed into the second heat exchanger 50B condense to liquid refrigerant.

At the time of the defrosting operation, frost is formed on each of the first heat exchanger 50A and the second heat exchanger 50B. As described above, both of the first heat exchanger 50A and the second heat exchanger 50B function as a condenser. Thus, at each of the first heat exchanger 50A and the second heat exchanger 50B, frost formed on each of the first heat exchanger 50A and the second heat exchanger 50B melts with heat released from refrigerant flowing therein. As a result, the first heat exchanger 50A and the second heat exchanger 50B are defrosted.

Liquid refrigerant that has flowed out from the first heat exchanger 50A flows into the refrigerant pipe 86A and is decompressed by the capillary tube 72A. Liquid refrigerant that has flowed out from the second heat exchanger 50B flows into the refrigerant pipe 86B and is decompressed by the capillary tube 72B. These liquid refrigerants merge at the connection point 73, which connects the refrigerant pipe 86A to the refrigerant pipe 85, and flow into the expansion valve 30. The liquid refrigerant is further decompressed by the expansion valve 30 and becomes low-pressure two-phase refrigerant. Two-phase refrigerant that has flowed out from the expansion valve 30 flows into the indoor heat exchanger 40 through the refrigerant pipe 84.

At the time of the cooling operation and at the time of the defrosting operation, the indoor heat exchanger 40 functions as an evaporator. That is, in the indoor heat exchanger 40, refrigerant flowing therein receives heat from indoor space air. As a result, two-phase refrigerant that has flowed into the indoor heat exchanger 40 evaporates into low-pressure gas refrigerant. Gas refrigerant that has flowed out from the indoor heat exchanger 40 flows through the refrigerant pipe 83 and the four-way valve 20 and is sucked into the compressor 10 from the suction port 10a. Gas refrigerant sucked into the compressor 10 is compressed and becomes high-temperature and high-pressure gas refrigerant. At the time of the cooling operation and at the time of the defrosting operation, the cycle described above is continuously repeated.

Next, the operation of the air-conditioning apparatus 100 at the time of the heating operation will be described. At the time of the heating operation, the four-way valve 20 is set to be in the first state. In the first state, the port E communicates with the port F, and the port G communicates with the port H. The flow switching valve 70 is set to be in the state I. In the state I, the port C communicates with the port B1, and the port C communicates with the port B2.

As a result, the first heat exchanger 50A and the bypass pipe 80 are disconnected from each other, and the second heat exchanger 50B and the bypass pipe 80 are disconnected from each other.

The compressor 10 sucks refrigerant from the refrigerant pipe 91 and compresses the refrigerant. The compressed refrigerant flows into the refrigerant pipe 83 through the refrigerant pipe 81, the refrigerant pipe 82, and the four-way valve 20.

Next, the refrigerant is caused to flow into the indoor heat exchanger 40 from the refrigerant pipe 83. The refrigerant is discharged from the compressor 10 and is high-temperature and high-pressure superheated vapor. The indoor heat exchanger 40 causes heat exchange to be performed between high-temperature and high-pressure refrigerant and indoor space air. Through this heat exchange, refrigerant condenses and liquefies. In this case, the indoor heat exchanger 40 functions as a condenser. Liquefied refrigerant flows into the refrigerant pipe 84 from the indoor heat exchanger 40. The controller 300 can adjust the rotation speed of the indoor fan 400 by outputting a control signal. By adjusting the rotation speed of the indoor fan 400, the volume of air sent to the indoor heat exchanger 40 is changed, and the amount of heat exchange between refrigerant and air in the indoor heat exchanger 40 can be adjusted.

Refrigerant that has flowed out from the indoor heat exchanger 40 into the refrigerant pipe 84 is caused to flow into the expansion valve 30. The refrigerant is decompressed by the expansion valve 30 and becomes low-pressure two-phase refrigerant. The two-phase refrigerant that has flowed out from the expansion valve 30 flows into the refrigerant pipe 85. The controller 300 can adjust the opening degree of the expansion valve 30 by outputting a control signal. The amount of decompression of refrigerant can be adjusted by adjusting the opening degree of the expansion valve 30. When the opening degree of the expansion valve 30 is increased, the pressure of refrigerant discharged from the expansion valve 30 increases. In contrast, when the opening degree of the expansion valve 30 is reduced, the pressure of refrigerant discharged from the expansion valve 30 decreases.

Refrigerant that has been decompressed by the expansion valve 30 and has flowed out into the refrigerant pipe 85 splits into the refrigerant pipe 86A and the refrigerant pipe 86B. Two-phase refrigerant that has flowed into the refrigerant pipe 86A is further decompressed by the capillary tube 72A and flows into the first heat exchanger 50A. In contrast, two-phase refrigerant that has flowed into the refrigerant pipe 86B is further decompressed by the capillary tube 72B and flows into the second heat exchanger 50B.

At the time of the heating operation, both of the first heat exchanger 50A and the second heat exchanger 50B function as an evaporator. That is, each of the first heat exchanger 50A and the second heat exchanger 50B causes heat exchange to be performed between refrigerant flowing therein and outdoor air sent by the outdoor fan 95, and the refrigerant receives heat from the outdoor air. As a result, two-phase refrigerant that has flowed into the first heat exchanger 50A and two-phase refrigerant that has flowed into the second heat exchanger 50B evaporate into low-pressure superheated refrigerant. The controller 300 can adjust the rotation speed of the outdoor fan 95 by outputting a control signal. By adjusting the rotation speed of the outdoor fan 95, the volume of air sent to the first heat exchanger 50A and that sent to the second heat exchanger 50B are changed, and the amount of heat exchange between refrigerant and air in each of the first heat exchanger 50A and the second heat exchanger 50B can be adjusted.

Refrigerant that has flowed out from the first heat exchanger 50A flows into the refrigerant pipe 87A, and refrigerant that has flowed out from the second heat exchanger 50B flows into the refrigerant pipe 87B. Refrigerant flowing in the refrigerant pipe 87A and refrigerant flowing in the refrigerant pipe 87B are merged by the flow switching valve 70 as indicated by the solid line in FIG. 1 and flow from the port C into the refrigerant pipe 89. Refrigerant flowing in the refrigerant pipe 89 flows through the four-way valve 20 and into the compressor 10 from the refrigerant pipe 91. At the time of the heating operation, the cycle described above is continuously repeated.

Note that while the heating operation is being performed, regarding the opening degree, the bypass valve 60 may be open or fully closed. In the flow switching valve 70, the port B1 communicates with the port C, and the port B2 communicates with the port C. Thus, even when refrigerant is present in the refrigerant pipe 88, refrigerant does not flow out from the port A to another port.

While the heating operation is being performed as described above, there may be a case where frost forms on the outdoor heat exchanger 50 and defrosting needs to be performed. In that case, it is conceivable that the heating operation will be temporarily stopped to switch to the defrosting operation, and high-temperature and high-pressure refrigerant resulting from compression performed by the compressor 10 will be caused to flow into the outdoor heat exchanger 50. In this case, the heating operation is suspended, and thus the temperature of the room decreases, and the degree of comfort of the indoor space decreases.

In contrast, in the heating-defrosting operation, while continuing the heating operation, the flow switching valve 70 is operated to defrost the first heat exchanger 50A and the second heat exchanger 50B in an alternating manner. In the following, the heating-defrosting operation will be described.

In the heating-defrosting operation, the four-way valve 20 is set to be in the first state. In the first state, the port E communicates with the port F, and the port G communicates with the port H. The flow switching valve 70 is set to be in the state II and the state III in an alternating manner. In the state II, the port A communicates with the port B1, and the port C communicates with the port B2. In the state III, the port A communicates with the port B2, and the port C communicates with the port B1.

Thus, in the state II, the first heat exchanger 50A and the bypass pipe 80 are disconnected from each other, and the second heat exchanger 50B communicates with the bypass pipe 80. In contrast, in the state III, the first heat exchanger 50A communicates with the bypass pipe 80, and the second heat exchanger 50B and the bypass pipe 80 are disconnected from each other.

In a case where frost forms on the outdoor heat exchanger 50 while the heating operation is being performed, and for example the first heat exchanger 50A needs to be defrosted, the flow switching valve 70 is set to be in the state III. As a result, the refrigerant pipe 88 and the refrigerant pipe 87A are connected to each other, and the refrigerant pipe 89 and the refrigerant pipe 87B are connected to each other. Consequently, a portion of high-temperature and high-pressure refrigerant discharged from the compressor 10 flows into the bypass pipe 80. The rest of the high-temperature and high-pressure refrigerant discharged from the compressor 10 flows into the indoor heat exchanger 40 through the refrigerant pipe 82, the four-way valve 20, and the refrigerant pipe 83. Refrigerant that has flowed into the bypass pipe 80 is decompressed by the bypass valve 60. The decompressed refrigerant flows from the bypass valve 60 into the first heat exchanger 50A, which is to be defrosted, through the refrigerant pipe 88, the flow switching valve 70, and the refrigerant pipe 87A. In this case, the first heat exchanger 50A functions as a condenser. Refrigerant that has flowed into the first heat exchanger 50A condenses while exchanging heat with frost to defrost the first heat exchanger 50A.

In this case, the amount of refrigerant flowing into the first heat exchanger 50A, which is to be defrosted, is adjusted by changing the opening degree of the bypass valve 60, so that the amount of heat exchange between refrigerant and frost can be adjusted. When the opening degree of the bypass valve 60 is increased, the amount of refrigerant flowing out from the outlet of the bypass valve 60 increases, the amount of refrigerant flowing in the first heat exchanger 50A increases, and the amount of heat exchange between refrigerant and frost increases. In this case, the amount of refrigerant flowing in the indoor heat exchanger 40 decreases, and thus the heating capacity decreases. In contrast, when the opening degree of the bypass valve 60 is reduced, the amount of refrigerant flowing out from the outlet of the bypass valve 60 decreases, the amount of refrigerant flowing in the first heat exchanger 50A decreases, and the amount of heat exchange between refrigerant and frost decreases. In this case, the amount of refrigerant flowing in the indoor heat exchanger 40 increases, and thus the heating capacity increases. The bypass valve 60 is controlled in accordance with a control signal from the controller 300.

Refrigerant that has condensed in the first heat exchanger 50A merges at the connection point 73, which connects the refrigerant pipe 86A to the refrigerant pipe 85, with refrigerant that has condensed in the indoor heat exchanger 40 and that is decompressed by the expansion valve 30. The resulting refrigerant flows into the refrigerant pipe 86B.

Refrigerant that has flowed into the refrigerant pipe 86B flows into the second heat exchanger 50B and evaporates. In this case, the second heat exchanger 50B functions as an evaporator. Thereafter, the refrigerant returns to the compressor 10 through the refrigerant pipe 87B, the flow switching valve 70, the refrigerant pipe 89, the four-way valve 20, and the refrigerant pipe 91.

In contrast, in a case where frost forms on the outdoor heat exchanger 50 while the heating operation is being performed, and for example the second heat exchanger 50B needs to be defrosted, the flow switching valve 70 is set to be in the state II. As a result, the refrigerant pipe 88 and the refrigerant pipe 87B are connected to each other, and the refrigerant pipe 87A and the refrigerant pipe 89 are connected to each other. Consequently, a portion of high-temperature and high-pressure refrigerant discharged from the compressor 10 flows into the bypass pipe 80. The rest of the high-temperature and high-pressure refrigerant discharged from the compressor 10 flows into the indoor heat exchanger 40 through the refrigerant pipe 82, the four-way valve 20, and the refrigerant pipe 83. Refrigerant that has flowed into the bypass pipe 80 is decompressed by the bypass valve 60. The decompressed refrigerant flows from the bypass valve 60 into the second heat exchanger 50B, which is to be defrosted, through the refrigerant pipe 88, the flow switching valve 70, and the refrigerant pipe 87B. Refrigerant that has flowed into the second heat exchanger 50B condenses while exchanging heat with frost to defrost the second heat exchanger 50B. In this case, the second heat exchanger 50B functions as a condenser.

In this case, by changing the opening degree of the bypass valve 60 in accordance with a control signal from the controller 300, the amount of refrigerant flowing into the second heat exchanger 50B, which is to be defrosted, is adjusted, and the amount of heat exchange between refrigerant and frost can be adjusted. The operation performed in this case is the same as that in the case where the first heat exchanger 50A is to be defrosted, and thus reference is made to the description above, and detailed description will be omitted here.

Refrigerant that has condensed in the second heat exchanger 50B merges at the connection point 73, which connects the refrigerant pipe 86B to the refrigerant pipe 85, with refrigerant that has condensed in the indoor heat exchanger 40 and that is decompressed by the expansion valve 30. The resulting refrigerant flows into the refrigerant pipe 86A.

Refrigerant that has flowed into the refrigerant pipe 86A flows into the first heat exchanger 50A and evaporates. In this case, the first heat exchanger 50A functions as an evaporator. Thereafter, the refrigerant returns to the compressor 10 through the refrigerant pipe 87A, the flow switching valve 70, the refrigerant pipe 89, the four-way valve 20, and the refrigerant pipe 91.

In the heating-defrosting operation, while continuing heating, the first heat exchanger 50A and the second heat exchanger 50B are alternately defrosted. When the case where the first heat exchanger 50A is defrosted is compared with the case where the second heat exchanger 50B is defrosted, only the state of the flow switching valve 70 differs. That is, in a case where the flow switching valve 70 is set to be in the state III, the first heat exchanger 50A is defrosted, and the second heat exchanger 50B functions as an evaporator. In contrast, in a case where the flow switching valve 70 is set to be in the state II, the second heat exchanger 50B is defrosted, and the first heat exchanger 50A functions as an evaporator. In this manner, one out of the first heat exchanger 50A and the second heat exchanger 50B functions as an evaporator, and thus the heating operation can be continued. Note that in the heating-defrosting operation, it is preferable that defrosting of the first heat exchanger 50A and defrosting of the second heat exchanger 50B be performed at least one time each. Considering that water generated by defrosting accumulates in the second heat exchanger 50B, which is the lower heat exchanger, it is more desirable that defrosting be performed in the order of the second heat exchanger 50B, the first heat exchanger 50A, and lastly the second heat exchanger 50B.

In the following, a problem regarding the degree of comfort and a solution based on Embodiment 1 in the heating-defrosting operation will be described.

During the heating-defrosting operation, the number of the outdoor heat exchanger 50 serving as an evaporator is reduced to half of that available at the time of the normal heating operation. That is, at the time of the normal heating operation, both of the first heat exchanger 50A and the second heat exchanger 50B function as an evaporator in the outdoor heat exchanger 50. In contrast, during the heating-defrosting operation, one out of the first heat exchanger 50A and the second heat exchanger 50B functions as an evaporator, and the other functions as a condenser in the outdoor heat exchanger 50. Thus, the heating capacity is likely to decrease. When the heating capacity decreases, the temperature of the indoor heat exchanger 40 decreases, and an air outlet temperature decreases. As a result, the temperature of the room decreases, and the degree of comfort decreases.

Figure 2:
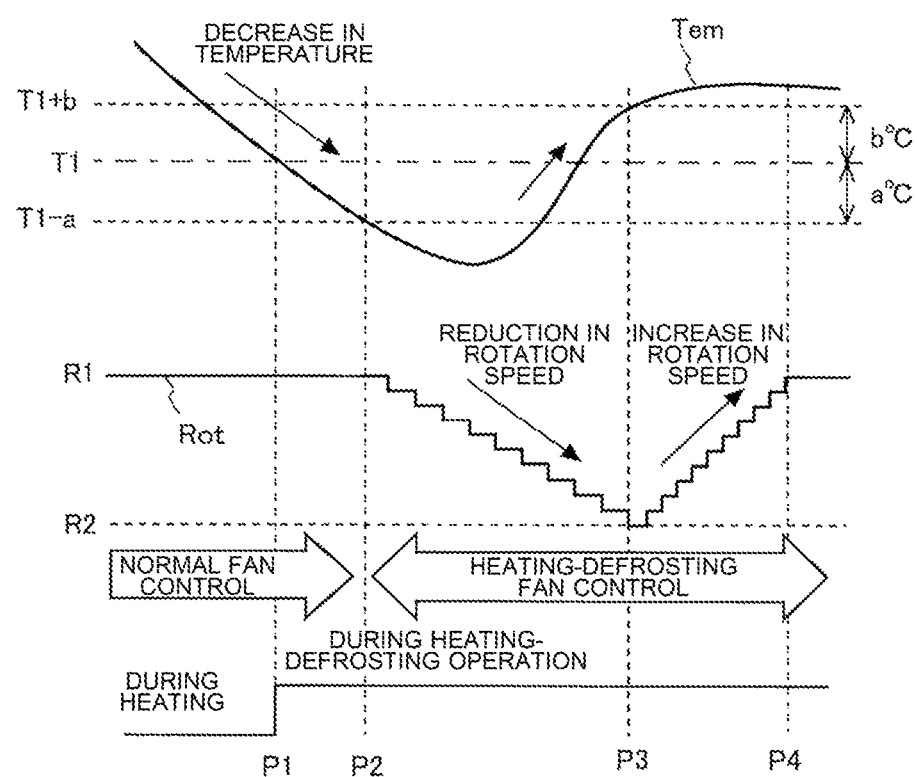
FIG. 2 is a diagram describing a method for controlling the rotation speed of an indoor fan in the air-conditioning apparatus according to Embodiment 1.
Figure 3:
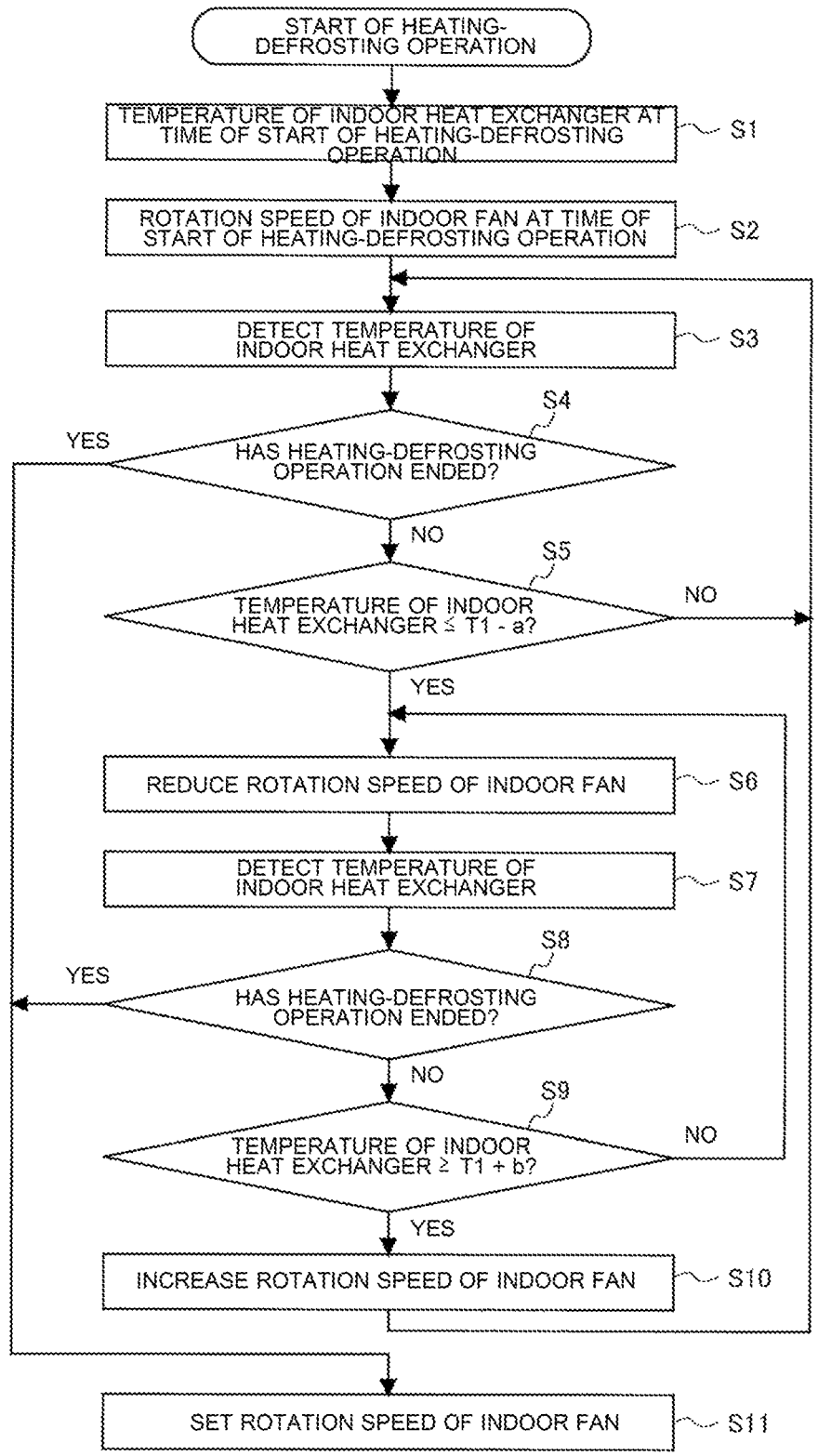
FIG. 3 is a flow chart illustrating the procedure of processing for controlling the rotation speed of the indoor fan in the air-conditioning apparatus according to Embodiment 1.

In order to solve the problem described above, in Embodiment 1, the controller 301 controls the rotation speed of the indoor fan 400 in accordance with the temperature of the indoor heat exchanger 40. In the following, a method for controlling the rotation speed of the indoor fan 400 will be described using FIGS. 2 and 3. FIG. 2 is a diagram for describing a method for controlling the rotation speed of the indoor fan 400 in the air-conditioning apparatus 100 according to Embodiment 1. FIG. 3 is a flow chart illustrating the procedure of processing for controlling the rotation speed of the indoor fan 400 in the air-conditioning apparatus 100 according to Embodiment 1.

First of all, the summary of the method for controlling the rotation speed of the indoor fan 400 in the air-conditioning apparatus 100 according to Embodiment 1 will be described with reference to FIG. 2.

The controller 301 increases and reduces a rotation speed Rot of the indoor fan 400 during the heating-defrosting operation with reference to a temperature Tem of the indoor heat exchanger 40 obtained at the time of the start of the heating-defrosting operation. As a result, the controller 301 can perform control to prevent the air outlet temperature and the heating capacity of the indoor unit 2 from excessively decreasing during the heating-defrosting operation.

In FIG. 2, the temperature Tem of the indoor heat exchanger 40 is a temperature T1 degrees C. at the time of the start of the heating-defrosting operation. Thus, the temperature T1 degrees C. serves as a reference. The temperature Tem of the indoor heat exchanger 40 is detected by the temperature detection unit 200. In the following, the temperature T1 degrees C. serving as a reference will be called a first temperature. In FIG. 2, a rotation speed R1 is the rotation speed Rot of the indoor fan 400 obtained at the time of the start of the heating-defrosting operation. A time P1 represents a time at which the heating-defrosting operation is started. A time P2 represents a time at which the temperature Tem of the indoor heat exchanger 40 reaches (T1−a) degrees C. A time P3 represents a time at which the temperature Tem of the indoor heat exchanger 40 reaches (T1+b) degrees C. In this case, a and b are a 0 and b 0 and are both preset values. In the following, a and b are called a first setting value a and a second setting value b, respectively.

As illustrated in FIG. 2, after the heating-defrosting operation is started at the time P1, the temperature Tem of the indoor heat exchanger 40 gradually decreases. The temperature detection unit 200 detects the temperature Tem of the indoor heat exchanger 40 at the time of the heating-defrosting operation at preset intervals. In the following, the temperature Tem of the indoor heat exchanger 40 during the heating-defrosting operation will be called a second temperature. The controller 301 gradually reduces the rotation speed Rot of the indoor fan 400 in a case where the second temperature is lower than the first temperature and where the difference between the first temperature and the second temperature is greater than or equal to the first setting value a. In other words, the controller 301 gradually reduces the rotation speed Rot of the indoor fan 400 from the point in time at which the second temperature of the indoor heat exchanger 40 reaches (T1−a) degrees C., that is, from the time P2. In the example in FIG. 2, at predetermined time intervals, the controller 301 reduces the rotation speed Rot of the indoor fan 400 in a step-wise manner and at a predetermined rate of reduction. However, the way in which the rotation speed Rot of the indoor fan 400 is reduced is not limited to this case. The rotation speed Rot of the indoor fan 400 may be linearly reduced at a predetermined rate of reduction and in proportion to elapsed time. The temperature Tem of the indoor heat exchanger 40 is increased by reducing the rotation speed Rot of the indoor fan 400, and the air outlet temperature of the indoor unit 2 can be prevented from decreasing. Note that, in this case, it takes time for the temperature Tem of the indoor heat exchanger 40 to start increasing, and thus the temperature Tem of the indoor heat exchanger 40 starts increasing after a predetermined time period has elapsed from the time P2.

In contrast, when the rotation speed Rot of the indoor fan 400 is reduced, the volume of air sent from the indoor fan 400 to the indoor heat exchanger 40 decreases. As a result, there may be a case where the heating capacity becomes insufficient for the heating load of the indoor space, and the temperature of the room decreases. Thus, to prevent the heating capacity from becoming insufficient, the lower limit of the rotation speed Rot of the indoor fan 400 may be preset in the controller 301. In that case, the controller 301 performs control such that the rotation speed Rot of the indoor fan 400 does not drop below the lower limit. The lower limit is stored in advance in a memory of the controller 301.

Between the time P2 and the time P3, the temperature Tem of the indoor heat exchanger 40 gradually increases due to a reduction in the rotation speed Rot of the indoor fan 400. The controller 301 gradually increases the rotation speed Rot of the indoor fan 400 in a case where the second temperature is higher than the first temperature and where the difference between the first temperature and the second temperature is greater than or equal to the second setting value b. In other words, the controller 301 gradually increases the rotation speed Rot of the indoor fan 400 from the point in time at which the second temperature of the indoor heat exchanger 40 reaches (T1+b) degrees C., that is, from the time P3. In the example in FIG. 2, at predetermined time intervals, the controller 301 increases the rotation speed Rot of the indoor fan 400 in a step-wise manner and at a predetermined rate of increase. However, the way in which the rotation speed Rot of the indoor fan 400 is increased is not limited to this case. The rotation speed Rot of the indoor fan 400 may be linearly increased at a predetermined rate of increase and in proportion to elapsed time. When the rotation speed Rot of the indoor fan 400 is increased, the volume of air sent from the indoor fan 400 to the indoor heat exchanger 40 increases. As a result, the heating capacity increases relative to the heating load of the indoor space, and the temperature of the room can be prevented from decreasing.

In this manner, the controller 301 can prevent the air outlet temperature and the heating capacity of the indoor unit 2 from excessively decreasing by increasing and reducing the rotation speed Rot of the indoor fan 400 with reference to the temperature T1, which is the first temperature. As a result, a balance can be struck between the air outlet temperature and the heating capacity of the indoor unit 2.

Note that the rate of increase of the rotation speed Rot of the indoor fan 400 relative to elapsed time is set to be greater than or equal to the rate of reduction of the rotation speed of the indoor fan 400 with respect to elapsed time. In other words, the rate of increase of the rotation speed Rot for a case where the rotation speed Rot of the indoor fan 400 is increased is greater than or equal to the rate of reduction of the rotation speed Rot for a case where the rotation speed of the indoor fan 400 is reduced. Thus, a time period (P4−P3), which is required for the rotation speed Rot of the indoor fan 400 to increase from R2 to R1, is less than or equal to a time period (P3−P2), which is required for the rotation speed Rot of the indoor fan 400 to decrease from R1 to R2.

In the description above, the rate of increase of the rotation speed Rot for a case where the rotation speed Rot of the indoor fan 400 is increased is described as being constant; however, the rate of increase does not have to be constant and may be variable. Similarly, the rate of reduction of the rotation speed Rot for a case where the rotation speed of the indoor fan 400 is reduced is described as being constant; however, the rate of reduction does not have to be constant and may be variable.

Next, the procedure of processing for controlling the rotation speed of the indoor fan in the air-conditioning apparatus 100 according to Embodiment 1 will be described using FIG. 3. The processing in FIG. 3 is performed at the time of the heating-defrosting operation.

First, in step S1, the controller 301 detects the temperature Tem of the indoor heat exchanger 40 using the temperature detection unit 200 at the time of the start of the heating-defrosting operation and stores the temperature Tem in a memory of the controller 301. The temperature Tem in this case is the temperature T1, which is the first temperature used as a reference. That is, in the example in FIG. 2, the temperature T1 is the temperature Tem at the time P1.

Alternatively, as another method, in step S1, the controller 301 may acquire, as the first temperature serving as the reference, the temperature Tem of the indoor heat exchanger 40 measured last by the temperature detection unit 200 during the heating operation of the air-conditioning apparatus 100 from the memory of the controller 301.

Next, in step S2, the controller 301 detects the rotation speed Rot of the indoor fan 400 at the time of the start of the heating-defrosting operation. The rotation speed Rot in this case is the rotation speed R1 at the time P1 in the example in FIG. 2.

Alternatively, as another method, in step S2, the controller 301 may acquire, as the rotation speed at the time of the start of the heating-defrosting operation, the rotation speed Rot of the indoor fan 400 measured last during the heating operation of the air-conditioning apparatus 100 from the memory of the controller 301.

Next, in step S3, the controller 301 detects the temperature Tem of the indoor heat exchanger 40 using the temperature detection unit 200.

Next, in step S4, the controller 301 determines whether the air-conditioning apparatus 100 has ended the heating-defrosting operation on the basis of information from the controller 300 of the outdoor unit 1. In a case where the controller 301 determines that the air-conditioning apparatus 100 has ended the heating-defrosting operation, the process proceeds to step S11. In contrast, in a case where the controller 301 determines that the air-conditioning apparatus 100 has not ended the heating-defrosting operation, the process proceeds to step S5.

In step S5, the controller 301 determines whether the temperature Tem of the indoor heat exchanger 40 acquired in step S3 is less than or equal to (T1−a) degrees C. In a case where the controller 301 determines that the temperature Tem of the indoor heat exchanger 40 is higher than (T1−a) degrees C., the process returns to step S3. In contrast, in a case where the controller 301 determines that the temperature Tem of the indoor heat exchanger 40 is less than or equal to (T1−a) degrees C., the process proceeds to step S6.

In this manner, the controller 301 repeats the loop from step S3 to "NO" in step S5 until a determination of "YES" is obtained in step S5. The loop from step S3 to "NO" in step S5 corresponds to the period from the time P1 to the time P2 in the example shown in FIG. 2.

Step S6 corresponds to the time P2 in the example in FIG. 2. In step S6, the controller 301 gradually reduces the rotation speed Rot of the indoor fan 400.

Next, in step S7, the controller 301 detects the temperature Tem of the indoor heat exchanger 40 again using the temperature detection unit 200. The temperature Tem in this case is a temperature at the time of the heating-defrosting operation, which is the second temperature.

Next, in step S8, the controller 301 determines whether the air-conditioning apparatus 100 has ended the heating-defrosting operation on the basis of information from the controller 300 of the outdoor unit 1. In a case where the controller 301 determines that the air-conditioning apparatus 100 has ended the heating-defrosting operation, the process proceeds to step S11. In contrast, in a case where the controller 301 determines that the air-conditioning apparatus 100 has not ended the heating-defrosting operation, the process proceeds to step S9.

In step S9, the controller 301 determines whether the temperature Tem of the indoor heat exchanger 40 acquired in step S7 is greater than or equal to (T1+b) degrees C. In a case where the controller 301 determines that the temperature Tem of the indoor heat exchanger 40 is lower than (T1+b) degrees C., the process returns to step S6. In contrast, in a case where the controller 301 determines that the temperature Tem of the indoor heat exchanger 40 is greater than or equal to (T1+b) degrees C., the process proceeds to step S10.

In this manner, the controller 301 repeats the loop from step S6 to "NO" in step S9 until a determination of "YES" is obtained in step S9. The loop from step S6 to "NO" in step S9 corresponds to the period from the time P2 to the time P3 in the example in FIG. 2.

Step S10 corresponds to the time P3 in the example in FIG. 2. In step S10, the controller 301 gradually increases the rotation speed Rot of the indoor fan 400. Thereafter, the process returns to step S3, and processing from step S3 to step S10 is repeated.

In step S11, the air-conditioning apparatus 100 has ended the heating-defrosting operation and restarts the heating operation. Thus, the controller 301 controls the indoor fan 400 at the rotation speed Rot set by the user using a remote controller or other devices. In this case, the rate of change of the rotation speed Rot of the indoor fan 400 may be constant or variable. Alternatively, the rate of change of the rotation speed Rot of the indoor fan 400 may be instantaneously changed.

In this manner, in Embodiment 1, the rotation speed Rot of the indoor fan 400 during the heating-defrosting operation is increased and decreased with reference to the temperature T1 of the indoor heat exchanger 40 obtained before the start of the heating-defrosting operation. As a result, the controller 301 can perform control to prevent the air outlet temperature and the heating capacity of the indoor unit 2 from excessively decreasing during the heating-defrosting operation.

The rotation speed Rot of the indoor fan 400 does not have to be gradually reduced and may be instantaneously reduced. However, in that case, the temperature Tem of the indoor heat exchanger 40 increases sharply, and the discharge pressure of the indoor unit 2 increases sharply. As a result, the frequency of the compressor 10 may decrease under protection control performed by the compressor 10. In that case, there may be a case where the flow rate of refrigerant decreases, where the defrosting capacity decreases, and where frost does not melt completely and remains. There may also be a case where the temperature Tem of the indoor heat exchanger 40 decreases and where the degree of comfort decreases. Thus, it is preferable that the rotation speed Rot of the indoor fan 400 be not instantaneously reduced but gradually reduced over a certain period of time.

The rotation speed Rot of the indoor fan 400 does not have to be gradually increased and may be instantaneously increased. However, in that case, there may be a case where the temperature Tem of the indoor heat exchanger 40 decreases sharply, where the air outlet temperature of the indoor unit 2 decreases, and where the degree of comfort of the indoor space decreases. Moreover, the user may feel uncomfortable due to a change in the volume of air flow or the sound of air flow. Thus, it is preferable that the rotation speed Rot of the indoor fan 400 be not instantaneously increased but gradually increased over a certain period of time.

When the rate of increase of the rotation speed Rot of the indoor fan 400 is low, there may be a case where the temperature of the indoor heat exchanger 40 increases sharply during the heating-defrosting operation and where the frequency of the compressor 10 is limited under condensing pressure protection. When the frequency of the compressor 10 is limited, there may be a case where the flow rate of refrigerant decreases, where the defrosting capacity decreases, and where frost does not melt completely and remains. There may also be a case where the temperature Tem of the indoor heat exchanger 40 decreases and where the degree of comfort decreases. Thus, as described above, the rate of increase of the rotation speed Rot of the indoor fan 400 needs to be at least equal to or greater than the rate of reduction of the rotation speed of the indoor fan 400. Thus, in Embodiment 1, as described above, the rate of increase of the rotation speed Rot of the indoor fan 400 relative to elapsed time is set to be greater than or equal to the rate of reduction of the indoor fan 400 with respect to elapsed time.

Although the upper limit of the rotation speed Rot of the indoor fan 400 does not have to be provided, the user can be prevented from feeling uncomfortable due to a change in the volume of air flow or the sound of air flow by setting, as the upper limit, the rotation speed of the indoor fan 400 set by the user using a remote controller or other devices. In this case, the controller 301 performs control such that the rotation speed Rot of the indoor fan 400 does not exceed the upper limit.

As described above, a reduction in the air outlet temperature and an excessive reduction in the heating capacity during the heating-defrosting operation can be suppressed by performing control such that the rotation speed Rot of the indoor fan 400 during the heating-defrosting operation is reduced and increased with reference to the temperature T1 of the indoor heat exchanger 40 obtained before the start of the heating-defrosting operation. As a result, the heating-defrosting operation becomes possible that does not reduce the temperature of the room and that does not reduce the degree of comfort.

As described above, in Embodiment 1, when the temperature of the indoor heat exchanger 40 obtained before the start of the heating-defrosting operation is treated as the first temperature, and the temperature of the indoor heat exchanger 40 obtained at the time of the heating-defrosting operation is treated as the second temperature, the controller 301 reduces the rotation speed of the indoor fan 400 in a case where the second temperature is lower than the first temperature and where the difference between the first temperature and the second temperature is greater than or equal to the first setting value a. Consequently, the temperature of the indoor heat exchanger 40 can be increased. As a result, the air outlet temperature of the indoor unit 2 can be prevented from decreasing during the heating-defrosting operation. In this manner, in Embodiment 1, the heating-defrosting operation can be performed that does not reduce the temperature of the room and that does not reduce the degree of comfort.

In Embodiment 1, the controller 301 increases the rotation speed Rot of the indoor fan 400 in a case where the second temperature is higher than the first temperature and where the difference between the first temperature and the second temperature is greater than or equal to the second setting value b. Consequently, the heating capacity can be prevented from decreasing. In this manner, in Embodiment 1, the air outlet temperature and the heating capacity of the indoor unit 2 can be prevented from excessively decreasing during the heating-defrosting operation. As a result, in Embodiment 1, the heating-defrosting operation can be performed that does not reduce the temperature of the room and that does not reduce the degree of comfort.

Embodiment 2

Figure 4:
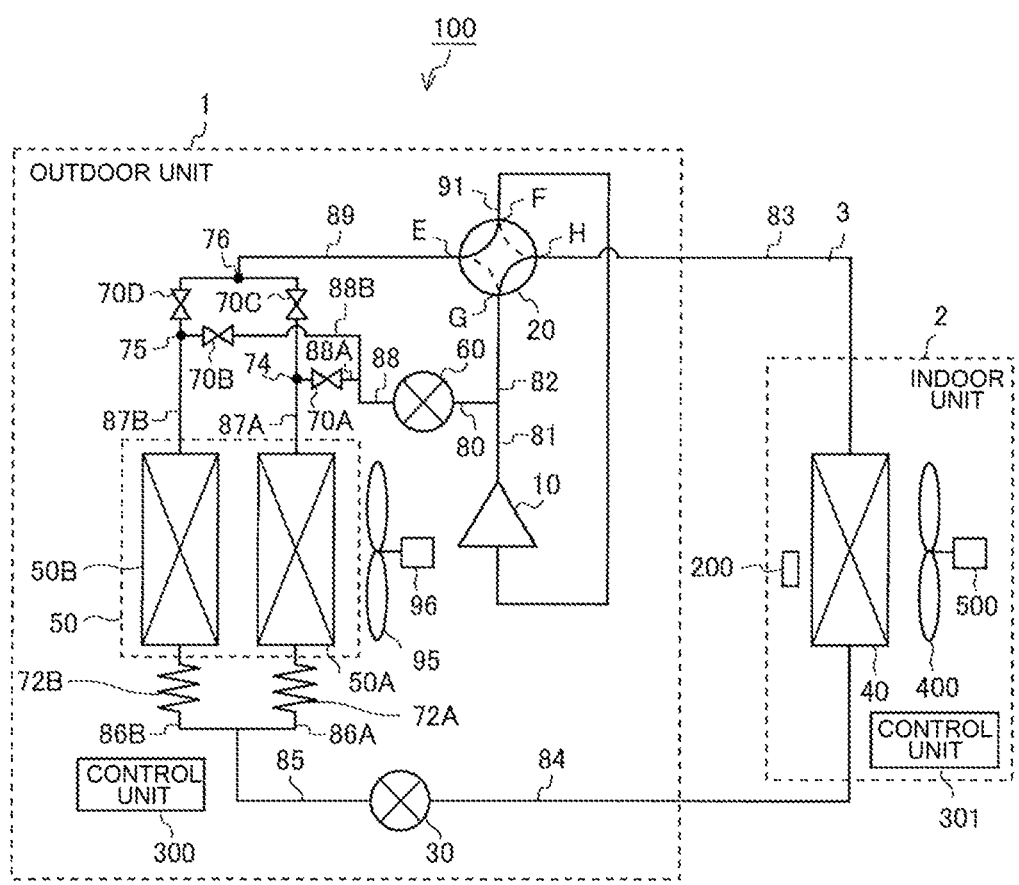
FIG. 4 is a configuration diagram illustrating the configuration of an air-conditioning apparatus according to Embodiment 2.

FIG. 4 is a configuration diagram illustrating the configuration of an air-conditioning apparatus 100 according to Embodiment 2. A difference between FIG. 1 and FIG. 4 is that four on-off valves 70A, 70B, 70C, and 70D are provided in FIG. 4 instead of the flow switching valve 70 in FIG. 1.

Moreover, in FIG. 4, the refrigerant pipe 88 branches midway therealong into a refrigerant pipe 88A and a refrigerant pipe 88B. The refrigerant pipe 88A is connected to the refrigerant pipe 87A at a connection point 74. The refrigerant pipe 88B is connected to the refrigerant pipe 87B at a connection point 75.

In FIG. 4, the refrigerant pipe 89 branches at a bifurcation 76 and is connected to the refrigerant pipe 87A and the refrigerant pipe 87B.

The on-off valve 70A is provided in the refrigerant pipe 88A. The on-off valve 70B is provided in the refrigerant pipe 88B. The on-off valve 70C is connected between the connection point 74 and the bifurcation 76 in the refrigerant pipe 87A. The on-off valve 70D is connected between the connection point 75 and the bifurcation 76 in the refrigerant pipe 87B.

In Embodiment 1 described above, the second flow switch device is the flow switching valve 70, which is formed of a single integrated valve; however, as in FIG. 4, the second flow switch device may be formed of the four on-off valves 70A, 70B, 70C, and 70D. Each of the on-off valves 70A, 70B, 70C, and 70D includes for example, a solenoid valve. The other configurations are the same as those in FIG. 1 and thus are denoted by the same reference numerals, and description thereof will be omitted here.

The four on-off valves 70A, 70B, 70C, and 70D form the second flow switch device, which switches the flow of refrigerant between at the time of the heating operation, at the time of the defrosting operation and at the time of the cooling operation, and at the time of the heating-defrosting operation. The second flow switch device may have the state I, the state II, and the state III, which have been described in Embodiment 1, by changing connection of ports in accordance with a control signal from the controller 300.

In the state I, the refrigerant pipe 89 and the refrigerant pipe 87A communicate with each other with the on-off valve 70C open, and the refrigerant pipe 89 and the refrigerant pipe 87B communicate with each other with the on-off valve 70D open. In this case, the on-off valves 70A and 70B are closed.

In the state II, the refrigerant pipe 88 and the refrigerant pipe 87B communicate with each other with the on-off valve 70B open, and the refrigerant pipe 89 and the refrigerant pipe 87A communicate with each other with the on-off valve 70C open. In this case, the on-off valves 70A and 70D are closed.

In the state III, the refrigerant pipe 88 and the refrigerant pipe 87A communicate with each other with the on-off valve 70A open, and the refrigerant pipe 89 and the refrigerant pipe 87B communicate with each other with the on-off valve 70D open. In this case, the on-off valves 70B and 70C are closed.

Under control performed by the controller 300, the on-off valves 70A, 70B, 70C, and 70D are set to be in the state I at the time of the heating operation, at the time of the defrosting operation, and at the time of the cooling operation and in the state II or the state III at the time of the heating-defrosting operation. As illustrated in FIG. 7, in Embodiment 2, the states of the four-way valve 20 serving as the first flow switch device and the states of the second flow switch device at the time of each operation mode are the same as those in Embodiment 1.

The other operations are the same as those in Embodiment 1, and thus description thereof will be omitted here.

In this manner, in Embodiment 2, the second flow switch device may have the state I, the state II, and the state III, which have been described in Embodiment 1, by opening and closing the on-off valves 70A, 70B, 70C, and 70D. As a result, the air-conditioning apparatus 100 can perform substantially the same operation as in Embodiment 1. Thus, even in Embodiment 2, substantially the same effects as those of Embodiment 1 can be obtained.

Embodiment 3

Figure 5:
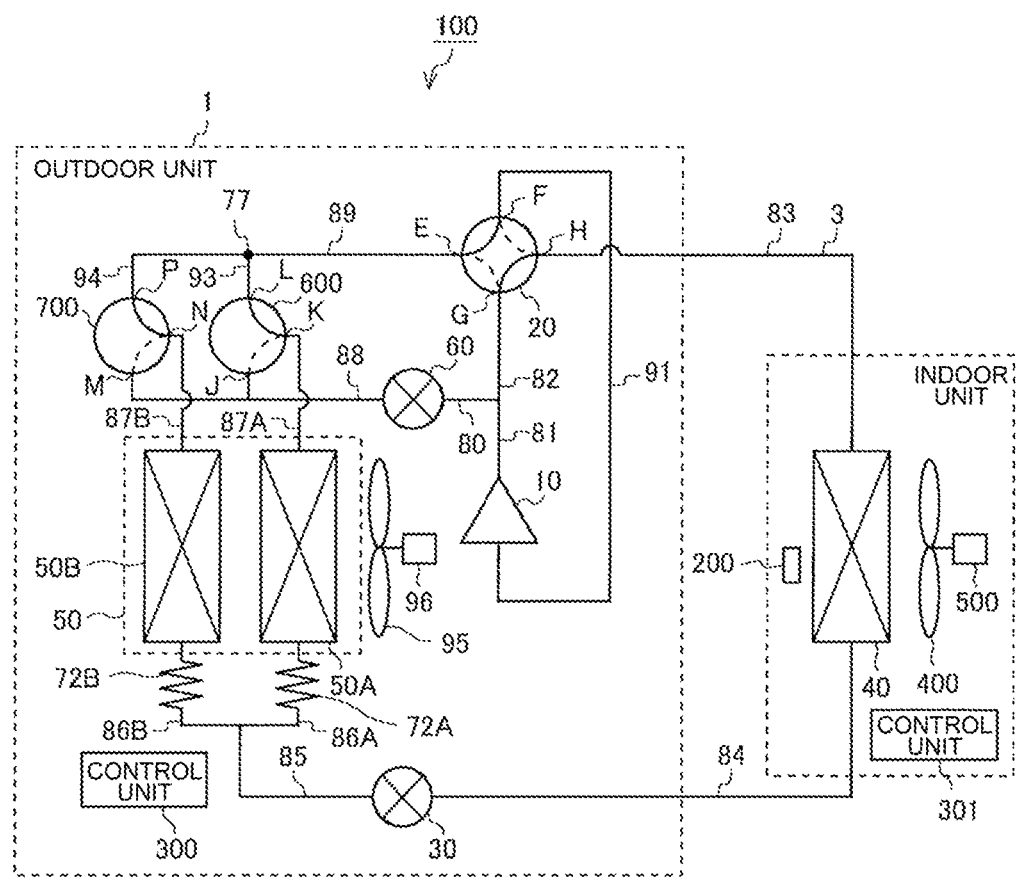
FIG. 5 is a configuration diagram illustrating the configuration of an air-conditioning apparatus according to Embodiment 3.

FIG. 5 is a configuration diagram illustrating the configuration of an air-conditioning apparatus 100 according to Embodiment 3. A difference between FIG. 1 and FIG. 5 is that two three-way valves 600 and 700 are provided in FIG. 5 instead of the flow switching valve 70 in FIG. 1. In FIG. 5, the refrigerant pipe 89 branches at a bifurcation 77 and is connected to a refrigerant pipe 93 and a refrigerant pipe 94.

The three-way valve 600 has three ports J, K, and L. The port J is connected to the refrigerant pipe 88. The port K is connected to the refrigerant pipe 87A. The port L is connected to the refrigerant pipe 93.

The three-way valve 700 has three ports M, N, and P. The port M is connected to the refrigerant pipe 88. The port N is connected to the refrigerant pipe 87B. The port P is connected to the refrigerant pipe 94.

The other configurations are the same as those in FIG. 1 and thus are denoted by the same reference numerals, and description thereof will be omitted here.

The three-way valves 600 and 700 form the second flow switch device, which switches the flow of refrigerant between at the time of the heating operation, at the time of the defrosting operation and at the time of the cooling operation, and at the time of the heating-defrosting operation. The second flow switch device may have the state I, the state II, and the state III, which have been described in Embodiment 1, by switching communication states of the ports of the three-way valves 600 and 700 in accordance with a control signal from the controller 300.

In the state I, the refrigerant pipe 89 communicates with the refrigerant pipe 87A through the port L and the port K communicating with each other, and the refrigerant pipe 89 communicates with the refrigerant pipe 87B through the port P and the port N communicating with each other.

In the state II, the refrigerant pipe 88 communicates with the refrigerant pipe 87B through the port M and the port N communicating with each other, and the refrigerant pipe 89 communicates with the refrigerant pipe 87A through the port L and the port K communicating with each other.

In the state III, the refrigerant pipe 88 communicates with the refrigerant pipe 87A through the port J and the port K communicating with each other, and the refrigerant pipe 89 communicates with the refrigerant pipe 87B through the port P and the port N communicating with each other.

Under control performed by the controller 300, the three-way valves 600 and 700 are set to be in the state I at the time of the heating operation, at the time of the defrosting operation, and at the time of the cooling operation and in the state II or the state III at the time of the heating-defrosting operation. As illustrated in FIG. 7, in Embodiment 3, the states of the four-way valve 20 serving as the first flow switch device and the states of the second flow switch device at the time of each operation mode are the same as those in Embodiment 1.

The other operations are the same as those in Embodiment 1, and thus description thereof will be omitted here.

In this manner, in Embodiment 3, the second flow switch device may have the state I, the state II, and the state III, which have been described in Embodiment 1, when the controller 300 switches communication states of the ports of the three-way valves 600 and 700. As a result, the air-conditioning apparatus 100 can perform substantially the same operation as in Embodiment 1. Thus, even in Embodiment 3, substantially the same effects as those of Embodiment 1 can be obtained.

Embodiment 4

Figure 6:
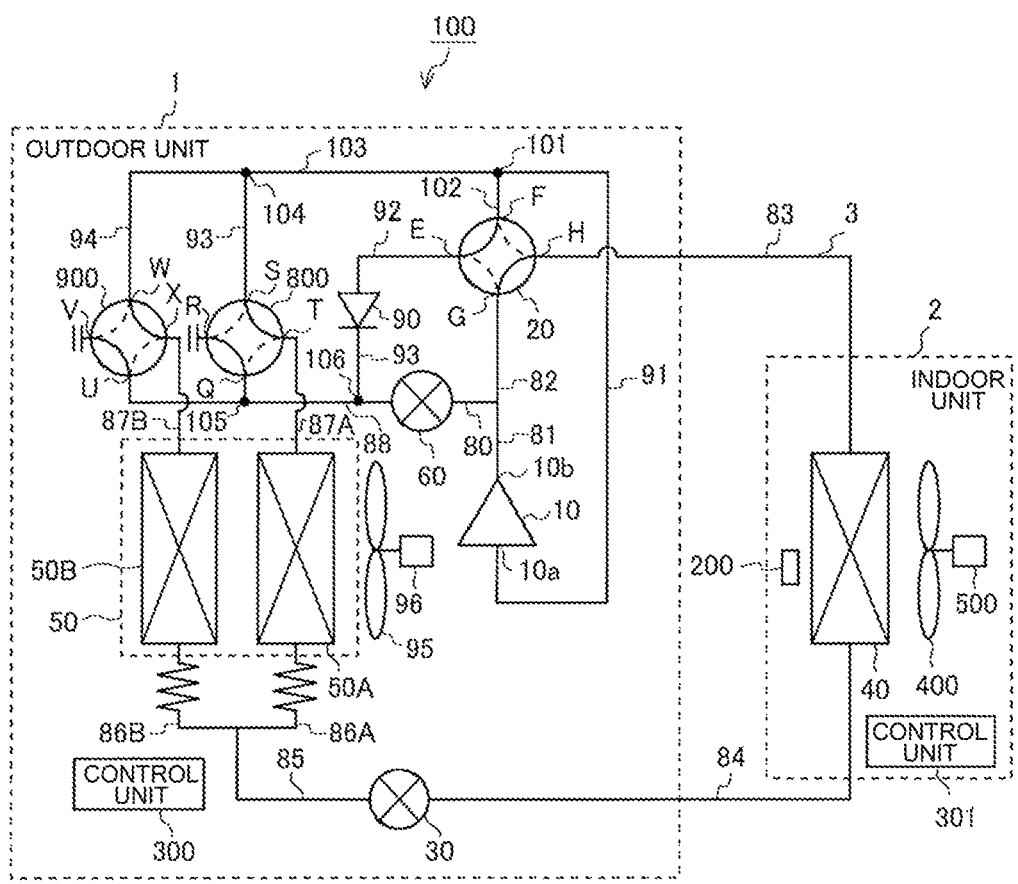
FIG. 6 is a configuration diagram illustrating the configuration of an air-conditioning apparatus according to Embodiment 4.

FIG. 6 is a configuration diagram illustrating the configuration of an air-conditioning apparatus 100 according to Embodiment 4. A main difference between FIG. 1 and FIG. 6 is that two four-way valves 800 and 900 are provided in FIG. 6 instead of the flow switching valve 70 in FIG. 1. The four-way valves 800 and 900 are assumed to be differential pressure valves, and thus a check valve 90 is used to ensure a pressure difference. In the following, the configuration of FIG. 6 will be described.

The four-way valve 800 has four ports Q, R, S, and T. The port R is closed such that refrigerant does not leak therefrom. The port S is connected to the refrigerant pipe 93. The port T is connected to the refrigerant pipe 87A. The port Q will be described below.

The four-way valve 900 has four ports U, V, W, and X. The port V is closed such that refrigerant does not leak therefrom. The port W is connected to the refrigerant pipe 94. The port X is connected to the refrigerant pipe 87B. The port U will be described below.

All of the four-way valve 20, the four-way valve 800, and the four-way valve 900 are four-way, differential pressure valves each driven by a pressure difference between the discharge pressure and the suction pressure. As the four-way valve 20, the four-way valve 800, and the four-way valve 900, four-way valves that are identically configured can be used. Note that the port R of the four-way valve 800 is closed, and the port V of the four-way valve 900 is closed. Thus, three-way valves that are identically configured can be used as the four-way valves 800 and 900.

In FIG. 6, the refrigerant pipe 88, which is connected to the bypass valve 60, branches at a bifurcation 105, and one branch of the refrigerant pipe 88 is connected to the port Q of the four-way valve 800, and the other branch of the refrigerant pipe 88 is connected to the port U of the four-way valve 900.

In the refrigerant pipe 88, another bifurcation 106 is provided between the bypass valve 60 and the bifurcation 105. The bifurcation 106 and the check valve 90 are connected by the refrigerant pipe 93. The check valve 90 and the port E of the four-way valve 20 are connected by a refrigerant pipe 92.

The check valve 90 allows refrigerant flowing in the direction from the port E of the four-way valve 20 toward the refrigerant pipe 88 and blocks refrigerant flowing in the direction from the refrigerant pipe 88 toward the port E. As the check valve 90, an on-off valve such as a solenoid valve or a motor operated valve is used that opens and closes under control performed by the controller 300. However, the check valve 90 is not limited to this case. As the check valve 90, an on-off valve may be used that opens and closes on the basis of a pressure difference between the upstream side and the downstream side of the valve. In that case, the on-off valve is open when the upstream pressure of the on-off valve is greater than the downstream pressure of the on-off valve and is closed when the downstream pressure of the on-off valve is greater than the upstream pressure of the on-off valve. In this manner, as the check valve 90, any device can be used as long as the device allows refrigerant flowing in one direction and blocks refrigerant flowing in the opposite direction.

An end of a refrigerant pipe 103 is connected to a bifurcation 101 provided midway along the refrigerant pipe 91. The other end of the refrigerant pipe 103 branches at a bifurcation 104 into the refrigerant pipe 93 and the refrigerant pipe 94. The refrigerant pipe 93 is connected to the port S of the four-way valve 800. The refrigerant pipe 94 is connected to the port W of the four-way valve 900.

The port T of the four-way valve 800 is connected to the first heat exchanger 50A with the refrigerant pipe 87A interposed therebetween. The port X of the four-way valve 900 is connected to the second heat exchanger 50B with the refrigerant pipe 87B interposed therebetween.

Note that the other configuration and operations are the same as those in Embodiment 1 and thus are denoted by the same reference numerals, and description thereof will be omitted here.

The four-way valves 800 and 900 form the second flow switch device, which switches the flow of refrigerant between at the time of the heating operation, at the time of the defrosting operation and at the time of the cooling operation, and at the time of the heating-defrosting operation. The second flow switch device may have the state I, the state II, and the state III, which have been described in Embodiment 1, by switching communication states of the ports of the four-way valves 800 and 900 in accordance with a control signal from the controller 300.

In the state I, the refrigerant pipe 103 communicates with the refrigerant pipe 87A through the port S and the port T communicating with each other, and the refrigerant pipe 103 communicates with the refrigerant pipe 87B through the port W and the port X communicating with each other.

In the state II, the refrigerant pipe 88 communicates with the refrigerant pipe 87B through the port U and the port X communicating with each other, and the refrigerant pipe 103 communicates with the refrigerant pipe 87A through the port S and the port T communicating with each other.

In the state III, the refrigerant pipe 88 communicates with the refrigerant pipe 87A through the port Q and the port T communicating with each other, and the refrigerant pipe 103 communicates with the refrigerant pipe 87B through the port W and the port X communicating with each other.

In accordance with a control signal from the controller 300, the four-way valves 800 and 900 are set to be in the state I at the time of the heating operation, at the time of the defrosting operation, and at the time of the cooling operation and in the state II or the state III at the time of the heating-defrosting operation. As illustrated in FIG. 7, in Embodiment 4, the states of the four-way valve 20 serving as the first flow switch device and the states of the second flow switch device at the time of each operation mode are the same as those in Embodiment 1.

The other operations are the same as those in Embodiment 1, and thus description thereof will be omitted in here.

In this manner, in Embodiment 4, the second flow switch device may have the state I, the state II, and the state III, which have been described in Embodiment 1, when the controller 300 switches communication states of the ports of the four-way valves 800 and 900. As a result, the air-conditioning apparatus 100 can perform substantially the same operation as in Embodiment 1. Thus, even in Embodiment 4, substantially the same effects as those of Embodiment 1 can be obtained.

Note that, in Embodiments 1 to 4 described above, the examples have been described in which the operation modes of the air-conditioning apparatuses 100 include the defrosting operation; however, the operation modes of the air-conditioning apparatuses 100 are not limited to this case, and the defrosting operation does not have to be set as an operation mode. In that case, three kinds of operation mode are provided, which are the cooling operation, the heating operation, and the heating-defrosting operation. Furthermore, the cooling operation does not also have to be set as an operation mode. In that case, two kinds of operation mode are provided, which are the heating operation and the heating-defrosting operation.

The invention claimed is:

1. An air-conditioning apparatus comprising:
a compressor having a suction port configured to suck refrigerant and a discharge port configured to discharge the refrigerant;
an indoor heat exchanger that is connected to the discharge port of the compressor and functions as a condenser at a time of a heating operation;
an outdoor heat exchanger that is connected to the suction port of the compressor and functions as an evaporator at the time of the heating operation;
a bypass pipe connected to the discharge port of the compressor;
a flow switching device provided between the bypass pipe and the outdoor heat exchanger;
an indoor fan that sends air to the indoor heat exchanger;
a temperature detection unit configured to detect a temperature of the indoor heat exchanger; and
a controller,
wherein
the outdoor heat exchanger includes a first heat exchanger and a second heat exchanger, in which refrigerant flow paths are independent of each other,
the flow switching device switches between connection and disconnection between the first heat exchanger and the bypass pipe and switches between connection and disconnection between the second heat exchanger and the bypass pipe in accordance with a control signal from the controller, and
the controller is configured to perform
a heating-defrosting operation, in which one out of the first heat exchanger and the second heat exchanger is caused to function as an evaporator, an other one out of the first heat exchanger and the second heat exchanger is caused to function as a condenser, and the indoor heat exchanger is caused to function as a condenser,
wherein
when a temperature of the indoor heat exchanger detected at a time of a start of the heating-defrosting operation by the temperature detection unit is treated as a first temperature, and
a temperature of the indoor heat exchanger detected during the heating-defrosting operation by the temperature detection unit is treated as a second temperature,
the controller is configured to reduce a rotation speed of the indoor fan from a rotation speed of the indoor fan at the time of the start of the heating-defrosting operation in a case where the second temperature is lower than the first temperature and where a difference between the first temperature and the second temperature is greater than or equal to a first setting value during the heating-defrosting operation, and in other cases, the rotation speed of the indoor fan at the time of the start of the heating-defrosting operation is maintained.

2. The air-conditioning apparatus of claim 1, wherein the controller is configured to
cause the flow switching device to disconnect the first heat exchanger and the bypass pipe from each other and disconnect the second heat exchanger and the bypass pipe from each other, cause the first heat exchanger and the second heat exchanger to function as the evaporator, and cause the indoor heat exchanger to function as the condenser at the time of the heating operation, and
cause the flow switching device to connect the one out of the first heat exchanger and the second heat exchanger and the bypass pipe to each other and disconnect the other one out of the first heat exchanger and the second heat exchanger and the bypass pipe from each other, cause the one out of the first heat exchanger and the second heat exchanger and the indoor heat exchanger to function as the condenser, and cause the other one out of the first heat exchanger and the second heat exchanger to function as the evaporator at the time of the heating-defrosting operation.

3. The air-conditioning apparatus of claim 1,
wherein the controller is configured to increase the rotation speed of the indoor fan in a case where the second temperature is higher than the first temperature and where the difference between the first temperature and the second temperature is greater than or equal to a second setting value during the heating-defrosting operation.

4. The air-conditioning apparatus of claim 3, wherein a rate of increase of the rotation speed for a case where the rotation speed of the indoor fan is increased is greater than or equal to a rate of reduction of the rotation speed for a case where the rotation speed of the indoor fan is reduced.

5. The air-conditioning apparatus of claim 1, wherein the controller is configured to perform control such that the rotation speed of the indoor fan does not drop below a lower limit.

6. The air-conditioning apparatus of claim 1, wherein the controller is configured to perform control such that the rotation speed of the indoor fan does not exceed an upper limit.

7. The air-conditioning apparatus of claim 1, wherein the first heat exchanger is arranged above the second heat exchanger in a vertical direction.

* * * * *